US012800061B2

(12) United States Patent
Kroczek et al.

(10) Patent No.: US 12,800,061 B2
(45) Date of Patent: Nov. 17, 2026

(54) ROTARY SHAFT POSITION DETECTION ASSEMBLY

(71) Applicant: B/E Aerospace, Inc., Winston Salem, NC (US)

(72) Inventors: Piotr Jacek Kroczek, Nieciszów (PL); Artur Ireneusz Tylicki, Wrocław (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 19/082,009

(22) Filed: Mar. 17, 2025

(65) Prior Publication Data

US 2025/0317031 A1 Oct. 9, 2025

(30) Foreign Application Priority Data

Apr. 8, 2024 (EP) .................................... 24461558

(51) Int. Cl.
*F16K 37/00* (2006.01)
*G01D 5/252* (2006.01)

(52) U.S. Cl.
CPC ......... *F16K 37/0041* (2013.01); *G01D 5/252* (2013.01)

(58) Field of Classification Search
CPC ............................ F16K 37/0041; G01D 5/252
See application file for complete search history.

(56) References Cited

U.S. PATENT DOCUMENTS 4,276,903 A * 7/1981 Spohr ................. F16K 37/0041 137/554
4,957,274 A * 9/1990 Hood .................. F16K 37/0041 251/129.05
5,099,867 A * 3/1992 Emery ................ F16K 37/0041 251/129.05
5,269,343 A * 12/1993 Trapp .................... F16K 31/502 251/266
5,350,955 A 9/1994 Street
(Continued)

FOREIGN PATENT DOCUMENTS

GB 2202677 9/1988

OTHER PUBLICATIONS

European Patent Office, European Search Report dated Sep. 17, 2024 in Application No. 24461558.9.

*Primary Examiner* — Umashankar Venkatesan
(74) *Attorney, Agent, or Firm* — SNELL & WILMER L.L.P.

(57) ABSTRACT

A rotary position detection assembly for detecting the rotary position of a rotating shaft, the assembly comprising: a non-conductive plate mounted around the rotating shaft, and relative to which the shaft rotates, in use; the plate having formed thereon a first electrically conductive track forming a closed loop around the shaft, and a second track forming a closed loop around the rotating shaft and having electrically conductive points at predetermined positions around the second track separated by non-conductive portions; an electrically conductive member mounted to rotate with the shaft and to make contact with the first and the second track; and one or more output members to provide an output signal indicative of the rotary position of the shaft based on the position of the electrically conductive member relative to the electrically conductive points of the second track and its electrically conductive contact therewith.

17 Claims, 5 Drawing Sheets

(56) References Cited

U.S. PATENT DOCUMENTS

| | | | | |
|---|---|---|---|---|
| 6,182,690 | B1 * | 2/2001 | Robert | F16K 37/0041 137/554 |
| 2016/0069474 | A1 * | 3/2016 | Shaw | F16K 37/0041 137/68.18 |
| 2016/0287804 | A1 | 10/2016 | Madsen et al. | |
| 2018/0245704 | A1 | 8/2018 | Narita | |
| 2021/0315106 | A1 | 10/2021 | Kurowska et al. | |
| 2022/0260179 | A1 | 8/2022 | Sapija et al. | |
| 2023/0133838 | A1 | 5/2023 | Byrne et al. | |
| 2023/0383852 | A1 | 11/2023 | Kroczek et al. | |
| 2024/0117987 | A1 * | 4/2024 | Lovati | F16K 37/0033 |

* cited by examiner

ROTARY SHAFT POSITION DETECTION ASSEMBLY

CROSS-REFERENCE TO RELATED APPLICATIONS

This application claims priority to EP patent application Ser. No. 24461558.9, filed Apr. 8, 2024 and titled "ROTARY SHAFT POSITION DETECTION ASSEMBLY," which is incorporated by reference herein in its entirety for all purposes.

FIELD

The present disclosure is concerned with an assembly for detecting the rotary position of a rotary shaft such as the shaft of a valve e.g. a motorized ball valve.

BACKGROUND

There are many applications, in various fields, where a fluid flow is regulated or controlled by opening and closing valves. In water supply or sanitation systems, for example, the flow of water through the system is managed by opening and closing valves to allow, block or direct the flow of water. Manually operated valves may be opened or closed by turning a handle or lever. Many systems use automatic or motorized valves that are opened or closed by means of an electric motor. Valves often include a valve body providing fluid inlets/outlets and a closure element having one or more passages therethrough. The position of the closure element relative to the valve body either allows the flow of fluid from an inlet, through the passage, to an outlet, when the passage is aligned with the inlet/outlet, or, when the passage is not aligned with the inlet and/or outlet, flow of fluid through the valve is blocked. Some valves may comprise directional closures that have an open position when position in one direction and a closed position when positioned in another direction. Other valves may be rotational valves. A rotational valve comprises a rotational closure element that rotates relative to the housing between the valve open and the valve closed position. An example of a rotational valve is a ball valve where the closure element comprises a ball-type closure element located in the valve housing, and have a passage formed therethrough, and a shaft attached thereto. To open and close the valve, the shaft is rotated either manually or by a motor to rotate the ball and, therefore, the passage relative to the housing and so relative to the inlet (s)/outlet(s).

It is generally desirable to know the rotational position of the valve closure element with respect to the housing to determine whether the valve is open/closed or, where a valve can be partially open, then to determine the degree to which the valve is open and to determine the rate of fluid flow through the valve.

It is known to use a position sensor comprising micro-mechanical switches to determine the directional or rotational position of a valve. Such position sensors for rotational valves operate on the basis of the valve shaft having an irregular outer shape such that different micro-mechanical switches are actuated due to contact of the outer circumference of the shaft according to the rotational position of the shaft. Such position sensing requires the valve shaft to have an irregular or specific shape, and the micro-mechanical switches arranged around the shaft are complex, bulky and prone to wear. The shaft and the micro-mechanical switches have to be manufactured to high tolerance levels to provide an accurate position determination. Tolerances of each part of the sensor require time-consuming and careful assembly of the sensor components if, for example, false readings or spurious signals are to be avoided. The complex mechanical construction of such sensors requires the overall valve structure to be large. Frequent change of position and/or reverse rotation can add to mechanical stress on, and wear of the parts which can lead to damage of the switches or shorten their life. Furthermore, there are limitations to the use of such assemblies in high vibrational environments.

There is a need for a valve position detection assembly and method that does not rely on micromechanical switches.

SUMMARY

The present disclosure provides a rotary position detector assembly to detect the rotary position of a rotating shaft, having an electrically conductive member arranged to rotate with the shaft and a plate around the shaft relative to which the shaft rotates, the plate having a first conductive track forming a closed loop around the plate and a second track forming a closed loop around the plate the second track comprising conductive and non-conductive portions.

In one aspect, there is provided a rotary position detection assembly for detecting the rotary position of a rotating shaft, the assembly comprising: a non-conductive plate mounted around the rotating shaft, and relative to which the shaft rotates, in use; the plate having formed thereon a first electrically conductive track forming a closed loop around the shaft, and a second track forming a closed loop around the rotating shaft and having electrically conductive points at predetermined positions around the second track separated by non-conductive portions; an electrically conductive member mounted to rotate with the shaft and to make contact with the first and the second track; and one or more output members to provide an output signal indicative of the rotary position of the shaft based on the position of the electrically conductive member relative to the electrically conductive points of the second track and its electrically conductive contact therewith.

Also provided is a valve assembly including such a position detection assembly.

BRIEF DESCRIPTION OF THE DRAWINGS

Examples of the assembly according to the disclosure will now be described with reference to the drawings. It should be noted that these are examples only and variations are possible within the scope of the claims.

DETAILED DESCRIPTION

Figure 1:
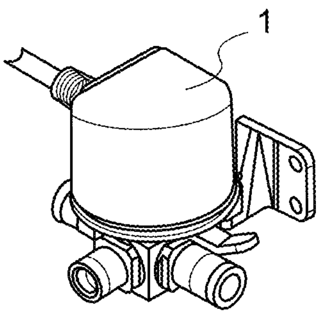
FIG. 1 Prior Art
FIG. 1 shows an example of a motorized valve which can incorporate a position detection assembly according to the disclosure.

FIG. 1 shows an example of a motorized rotary (ball) valve 1, by way of background. A position detection assembly according to this disclosure, described further below, can be used to detect the position of the ball shaft 2 of such a valve. It should be noted, however, that although the assembly of this disclosure will be described in relation to use with such a valve, the assembly can be used to detect the rotary position of other rotary shafts in other applications.

Figure 2:
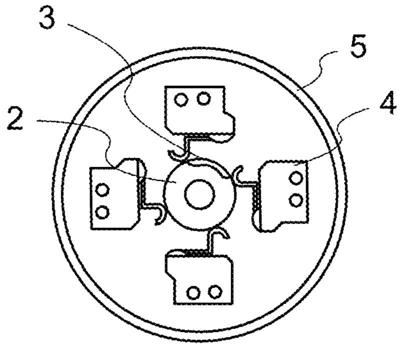
FIG. 2 Prior Art
FIG. 2 shows a known position detection assembly for a valve shaft using micromechanical switches.
Figure 3:
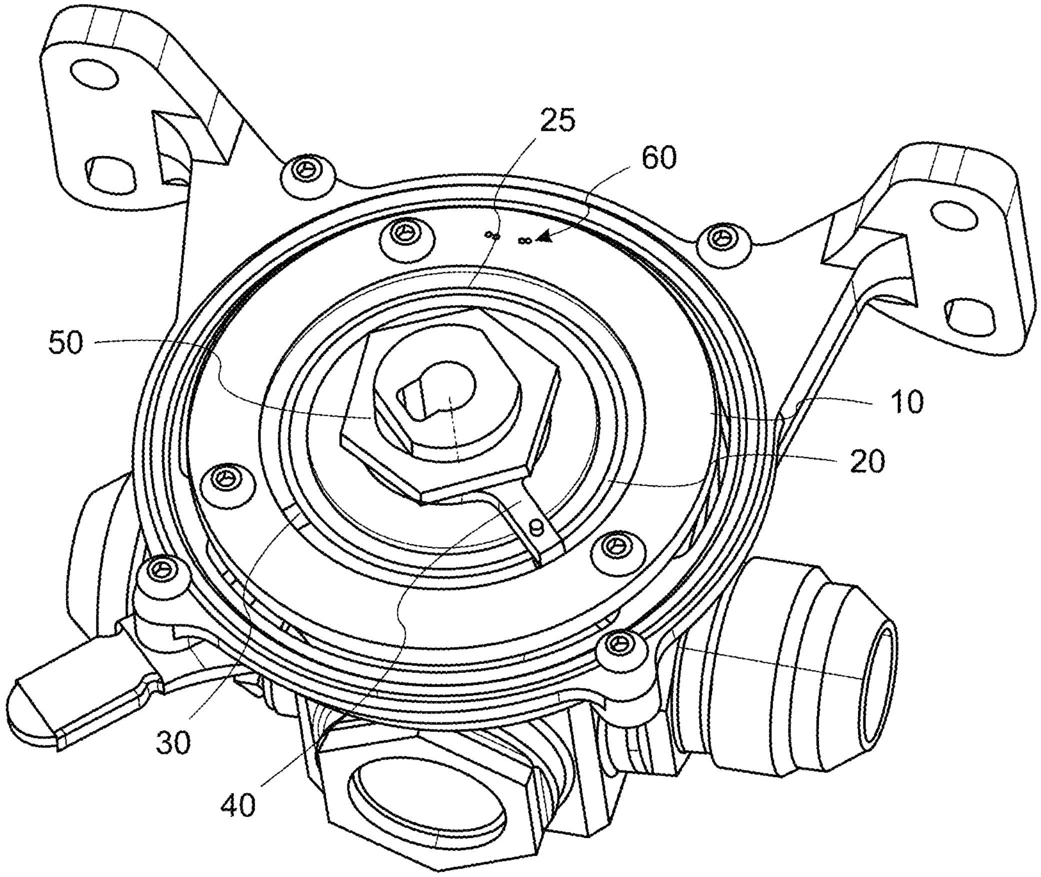
FIG. 3 illustrates a position detection assembly according to this disclosure in a valve assembly.

Conventionally, the rotary position of the ball shaft is detected using an arrangement of microswitches 4 as shown in FIG. 2. A cam shaft 3, that rotates with the ball shaft 2, has a cam profile such that at different rotational positions of the cam shaft (and, therefore, also of the ball shaft) contact is made with different ones of the mechanical switches 4 located around the shaft. Contact between the cam and the switches, triggers the switches which therefore provide an indication of the rotary position of the cam and ball shafts. The disadvantages of such a complex and precise assembly have been set out above.

Instead of using microswitches, as in the known assemblies, the present disclosure provides a position detection assembly comprising a non-conductive plate 10 around the rotating shaft 50 (here the ball shaft 50 of the ball valve). The plate 10 is mounted such that the shaft 50 rotates relative to the plate 10. For example, the plate 10 may be fixed to a housing of the valve. The plate 10 is formed with a first track 20 forming a closed loop around the plate and made of an electrically conductive material. The plate also has a second closed loop track 25 around the plate. The second track 25 is formed mainly of non-electrically conductive material with electrically conductive portions or points 30 at predetermined locations around the track 25. In the example shown, the second track 25 has two electrically conductive points 30 corresponding (as described further below) to a valve open and a valve closed position, respectively. It is envisaged that the second track 25 could be provided with more than two conductive points if other rotary positions are to be detected.

The first and second tracks are, in the example shown, substantially coaxial with the rotary shaft, with the first track being a radially inner track and the second track being a radially outer track. It is also possible that the second track may be the radially inner track.

The position detection assembly also includes an electrically conductive member 40 attached to and rotatable with the rotary shaft 50. The electrically conductive member 40 extends radially outwards from the shaft across the plate 10 *b* a radial distance sufficient to extend across both the first and second tracks and to make electrical contact with the first track and to contact the electrically conductive points on the second track when the circumferential position of the member 40 relative to the plate 10 corresponds to the position of the electrically conductive points 30.

The assembly further includes one or more output members 60 e.g. conductive pins, to provide an electrical output signal responsive to the electrically conductive member (hereinafter referred to as a 'slider' for simplicity) making electrical contact with both the first track and an electrically conductive point on the second track.

In operation, when the rotary shaft 50 is in a first known position (in this example, an open position of the valve, but in other applications this could be any desired position of a rotary shaft), the assembly is configured that the slider 40 is aligned with one of the electrically conductive points 30 on the second track. As the slider extends radially across both tracks, it therefore makes electrical contact with both the first track and the second track, thus closing an electrical circuit to generate an output signal via the/a respective output member 60. This then provides a reliable indication that the rotary shaft is at the first position (here the open position). Similarly, when the shaft is rotated to a second, known position e.g. a valve closed position, the slider will align with an electrically contact another conductive point 30 on the second track closing a second circuit and providing a second output signal via the/another output member 60 to indicate that the shaft is at a second (here closed) position. When the shaft (and, hence, the slider) is between the known positions, the slider will contact the first track 20 but will only be aligned with a non-conductive part of the second track and so will not produce a known position signal output.

As mentioned above, the assembly can be arranged to provide indications of more than two positions by having more than two conductive points on the second track 25.

Figure 4A:
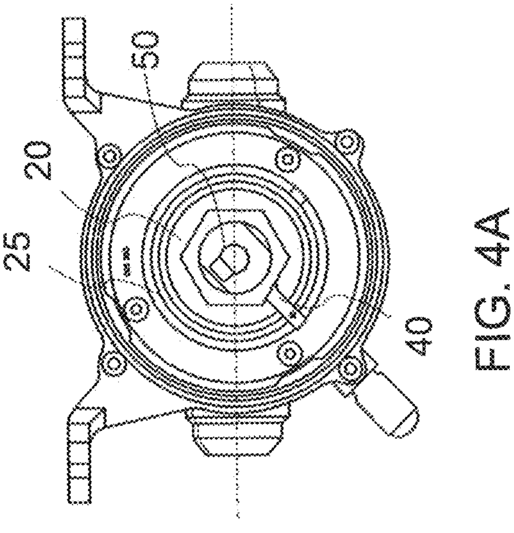
FIG. 4A shows a top view of an assembly as shown in FIG. 3 with the valve in a closed position.
Figure 4B:
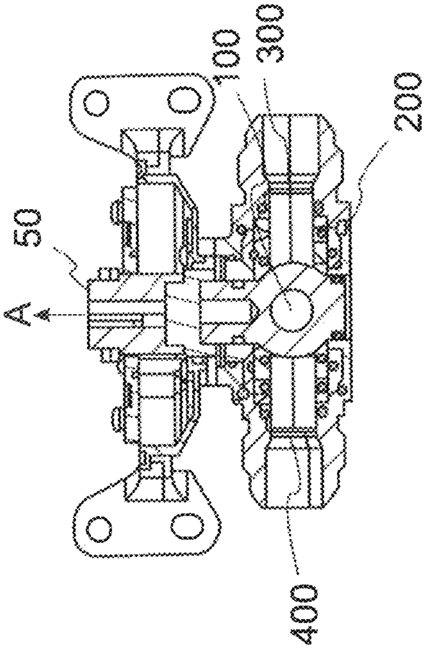
FIG. 4B shows a side view of an assembly as shown in FIG. 4A.

FIGS. 4A and 4B show the example valve in the closed position, where the ball shaft 50 has a rotary position such that the channel 100 through the valve ball 200 is out of alignment with the flow channel from the valve input 300 to the valve output (see FIG. 4A). When the shaft 50 is in this rotary position, the attached slider 40 is at a position (see FIG. 4B) in which it is aligned with and electrically contacts a first conductive point 30*a* on the second tack 25 as well as making electrical contact with the first track 20, which has a constant positive potential. This thus closes the electrical circuit been the first and second track via the conductive slider to produce an output signal indicating that the shaft is at the closed position.

Figure 5A:
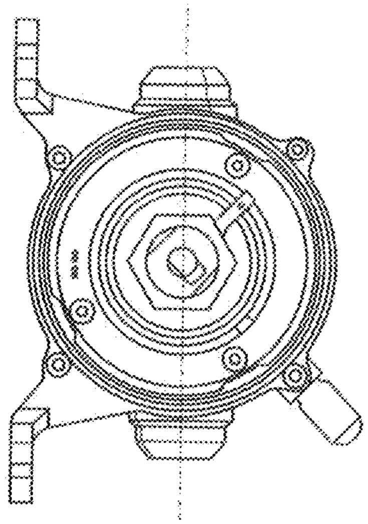
FIG. 5A shows a top view of an assembly as shown in FIG. 3 with the valve in an open position.
Figure 5B:
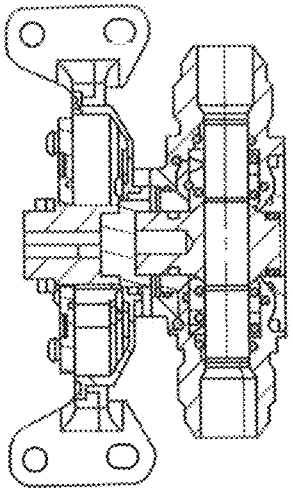
FIG. 5B shows a side view of an assembly as shown in FIG. 5A.

FIGS. 5A and 5B show the example valve in the open position, where the ball shaft 50 has a rotary position such that the channel 100 through the valve ball 200 is aligned with the flow channel from the valve input 300 to the valve output (see FIG. 5A). When the shaft 50 is in this rotary position, the attached slider 40 is at a position (see FIG. 5B) in which it is aligned with and electrically contacts a second conductive point 30*b* on the second tack 25 as well as making electrical contact with the first track 20, which has a constant positive potential. This thus closes the electrical circuit been the first and second track via the conductive slider to produce an output signal indicating that the shaft is at the open position.

Figure 6:
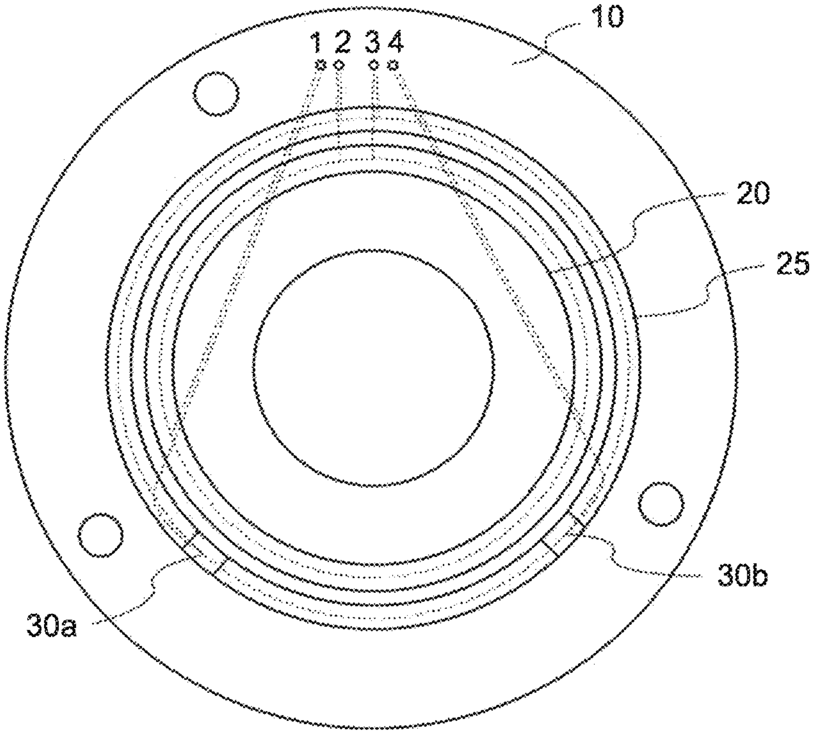
FIG. 6 is a plan view of a plate for use in an assembly according to the disclosure.

The first and second conductive points 30*a*, 30*b* on the second track 25 can be seen in FIG. 6.

Figure 7A:
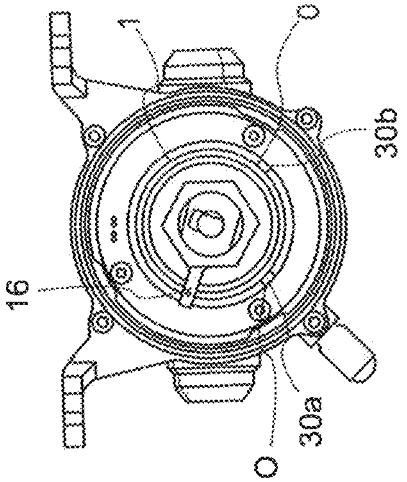
FIGS. 7A and 7B illustrate an assembly according to the disclosure when the shaft is in an intermediate or unknown position.
Figure 7B:
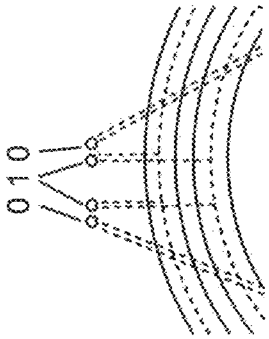
Figure 8A:
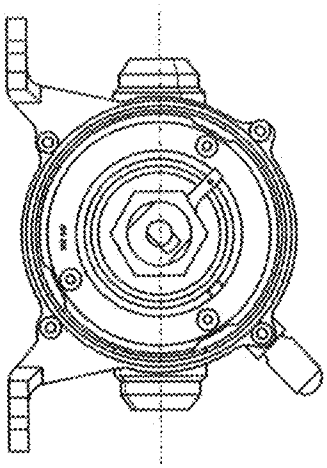
FIGS. 8A and 8B illustrate an assembly according to the disclosure when the shaft is in an open position.
Figure 8B:
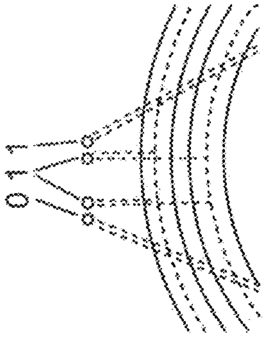
Figure 9A:
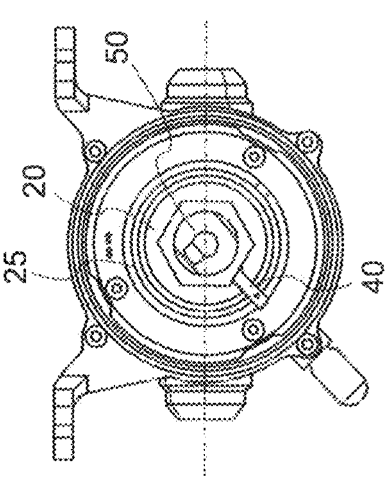
FIGS. 9A and 9B illustrate an assembly according to the disclosure when the shaft is in a closed position.
Figure 9B:
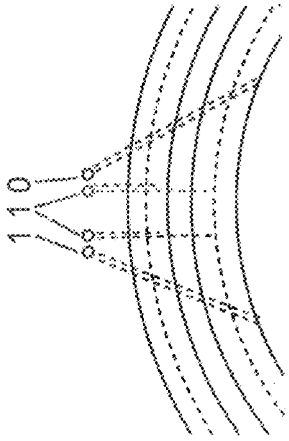

The different slider positions are also illustrated, for the example shown, in FIGS. 7A, 7B for an intermediate position, FIGS. 8A, 8B for an open position, and FIGS. 9A,9B for a closed position. In FIGS. 7A and 7B, the shaft, and hence the slider 40 are in a position intermediate the known first (open) and second (closed) positions. The slider 40 is in electrical contact with the first track (indicated by '1') but is not in electrical contact with either of the conductive points 30*a*, 30*b* of the second track (indicated by '0'). The output member can therefore output a signal indicative of '010'. The detection of contact with the first track provides a check for correct operation of the position detection assembly. In FIGS. 8A and 8B, the slider is aligned with and in electrical contact with contact point 30*b* on the second track 25, indicated by '1' as well as with the first track, indicated by '1' but not with the other conductive point 30*a* on the second track (hence '0') and so the output signal corresponds to states 011. In the closed position, the contact states are 110, as shown in FIGS. 9A and 9B.

Figure 10:
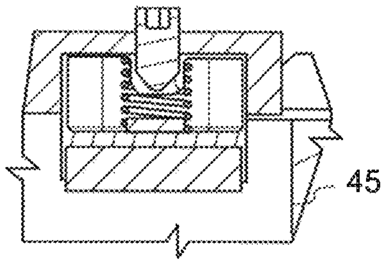
FIG. 10 shows a detailed view of a slider member for use in the assembly of the disclosure.
Figure 11:
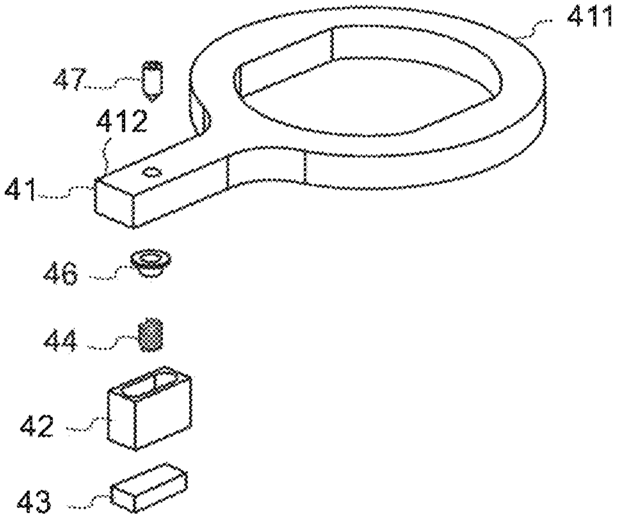
FIG. 11 is an exploded view of the slider member shown in FIG. 10.

An example of the construction of the electrically conductive member 40, referred to as the slider, is shown in FIGS. 10 and 11.

As mentioned above, the slider 40 should be mounted to rotate with the rotary shaft 50 and to extend radially outwards therefrom to extend across the first and second tracks in the radial direction (based on the axial direction being the axis of rotation A of the shaft 50 as shown in FIGS. 4B and 5B). At least the part of the slider that extends radially across the first and second tracks should be electrically conductive.

In the example shown, the slider 40 has a slider body 41 having a first end 411 configured to be attached to the rotary shaft. In this example, the first end 411 is in the form of a ring to fit around and mount to the shaft 50. The slider body has a second end 412 that extends across the first and second tracks. This second end is provided with or formed of an electrically conductive material for electrical contact with the tracks. In the example shown, the slider body is made of non-conductive material and an electrically conductive pad or block 43 is mounted to the second end 412. It is, however, envisaged that at least the second end of the body could, itself, be made of conductive material.

In the example shown, the conductive block 43 is secured in a housing 42 (here a non-conductive housing made of e.g. Teflon, but other materials are also envisaged) and is biased towards the tracks 20, 25 by means of a spring 44 inside the housing 42. If the spring is a metal or other conductive material spring, it can be separated from the conductive block 43 by a dielectric spacer 45. The position of the conductive block 43 relative to the tracks can be adjusted by means of a flange 46 and a worm screw 47. With such an arrangement, a closed electrical circuit is formed only between the first track 20, the conductive block 43 and the conductive point 30 of the second track 25, and no potential appears on other parts of the slider 40 or is conducted to the rotary shaft or other parts of the valve.

Figure 12:
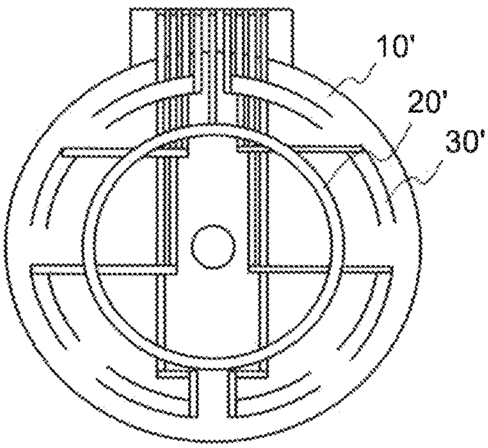
FIG. 12 shows a plate of an alternative example of an assembly of the disclosure.

In one example, as described above and shown in the Figs. mentioned above, the conductive track 20 and the conductive points on the second track are formed as a non-conductive plate provided with conductive pads where required. In an alternative example, as shown in FIG. 12, the plate can be formed from a printed circuit board, PCB, 10' having an etched first track 20' and conductive pads 30' etched for the second track. In this way, the conductive points 30' can be precisely printed for a given use/valve after measuring the position of the known (e.g. open and closed) positions. Additional positions can also be easily and precisely added. This provides a perfectly calibrated assembly that requires no adjustment of the slider and has improved accuracy and repeatability of positions and lower production costs. The principle of operation of the position detection assembly with such a plate 10' is the same as described above.

The position detection assembly of this disclosure has a simple, inexpensive, durable constructions which can provide a precise, reliable position detection indication and can be easily adapted to detect several different positions.

What is claimed is:

1. A rotary position detection assembly for detecting the rotary position of a rotating shaft, the assembly comprising:

a non-conductive plate mounted around the rotating shaft, and relative to which the rotating shaft rotates, in use;

the plate having formed thereon a first electrically conductive track forming a closed loop around the rotating shaft, and a second track forming a closed loop around the rotating shaft and having electrically conductive points at predetermined positions around the second track separated by non-conductive portions;

an electrically conductive member mounted to rotate with the rotating shaft and to make contact with the first and the second track, wherein the electrically conductive member is provided on a radially outer end of a non-conductive body attached to and radially extending from the rotating shaft, and wherein the electrically conductive member is a block of electrically conductive material mounted to the radially outer end of the non-conductive body and configured to contact the first and the second tracks, and wherein the block is positioned in a housing mounted to the end of the non-conductive body; and one or more output members to provide an output signal indicative of the rotary position of the rotating shaft based on the position of the electrically conductive member relative to the electrically conductive points of the second track and its electrically conductive contact therewith.

2. The assembly of claim 1, wherein the block is biased towards the first and second tracks by a spring.

3. The assembly of claim 2, further comprising a dielectric spacer between the block and the spring.

4. The assembly of claim 1, wherein the housing is made of electrically non-conductive material.

5. The assembly of claim 1, further comprising means for adjusting the position of the block relative to the first and second tracks.

6. The assembly of claim 1, wherein the plate is a printed circuit board and the first track and the conductive points of the second track are etched thereon.

7. The assembly of claim 1, wherein the one or more output members is an electrically conductive pin.

8. The assembly of claim 1, comprising two conductive points on the second track corresponding, respectively, to first and second known rotary positions of the rotating shaft.

9. A valve assembly comprising a moveable valve member moveable between an open and a closed position by rotation of a rotary shaft between a first and a second rotary position, and a position detection assembly as claimed in claim 1 to detect the rotary position of the rotary shaft.

10. The valve assembly of claim 9, wherein the output member is configured to provide an output indicative of the open and the closed position of the valve.

11. The valve assembly of claim 9, wherein the moveable valve member is a ball and the rotating shaft is a ball shaft.

12. A rotary position detection assembly for detecting the rotary position of a rotating shaft, the assembly comprising:

a non-conductive plate mounted around the rotating shaft, and relative to which the rotating shaft rotates, in use;

the plate having formed thereon a first electrically conductive track forming a closed loop around the rotating shaft, and a second track forming a closed loop around the rotating shaft and having electrically conductive points at predetermined positions around the second track separated by non-conductive portions;

an electrically conductive member mounted to rotate with the rotating shaft and to make contact with the first and the second track, wherein the electrically conductive member is provided on a radially outer end of a non-conductive body attached to and radially extending from the rotating shaft, and wherein the electrically conductive member is a block of electrically conductive material mounted to the radially outer end of the non-conductive body and configured to contact the first and the second tracks, wherein the block is biased towards the first and second tracks by a spring;

a dielectric spacer between the block and the spring; and one or more output members to provide an output signal indicative of the rotary position of the rotating shaft based on the position of the electrically conductive member relative to the electrically conductive points of the second track and its electrically conductive contact therewith.

13. The assembly of claim 12, wherein the block is positioned in a housing mounted to the end of the non-conductive body.

14. The assembly of claim 13, wherein the housing is made of electrically non-conductive material.

15. The assembly of claim 12, further comprising means for adjusting the position of the block relative to the first and second tracks.

16. The assembly of claim 12, wherein the plate is a printed circuit board and the first track and the conductive points of the second track are etched thereon.

17. A valve assembly comprising a moveable valve member moveable between an open and a closed position by rotation of a rotary shaft between a first and a second rotary position, and a position detection assembly as claimed in claim 12 to detect the rotary position of the rotary shaft.

* * * * *